Sept. 23, 1924.

C. E. GARNER 1,509,423

DEAD BELT SHIFTING DEVICE

Filed Sept. 14, 1922

INVENTOR
Corman E. Garner.
BY
Adam E. Fisher.
ATTORNEY

Patented Sept. 23, 1924.

1,509,423

UNITED STATES PATENT OFFICE.

CORMAN E. GARNER, OF COLUMBUS, OHIO.

DEAD-BELT-SHIFTING DEVICE.

Application filed September 14, 1922. Serial No. 588,171.

*To all whom it may concern:*

Be it known that I, CORMAN E. GARNER, a citizen of the United States, residing in the city of Columbus and State of Ohio, have invented new and useful Improvements in Dead-Belt-Shifting Devices, of which the following is a specification, reference being had to the accompanying drawings.

This invention is in the way of a dead belt shifting device for line shaft pulleys, and the object is to provide a simple and practical means for shifting and deadening certain line shaft pulleys and belts directly while others remain running, and this without the use of countershafts or similar devices. Other advantages of this invention are the saving of power and the saving of oil ordinarily used on idling pulleys; the cheapness of construction and mounting; the saving of wear on belts when the connected machines are not being used. Other advantages will appear in the course of this specification.

Figure 1:
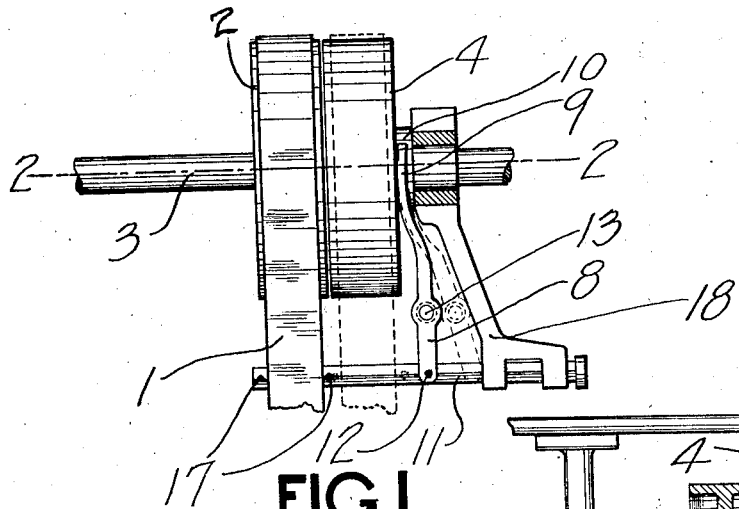
Figure 1 is a top plan view of the device as mounted in place on the line shaft adjacent a live pulley.
Figure 2:
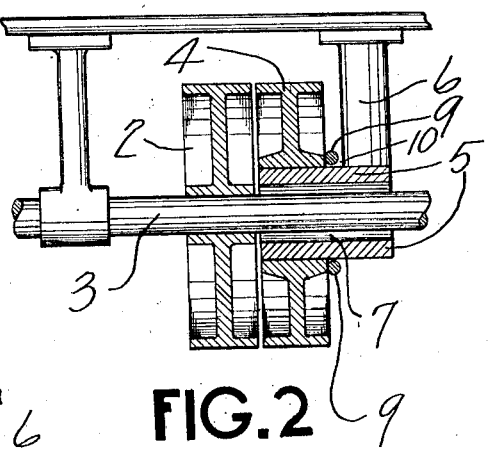
Figure 2 is a sectional view, taken on the line 2—2 in Figure 1.
Figure 3:
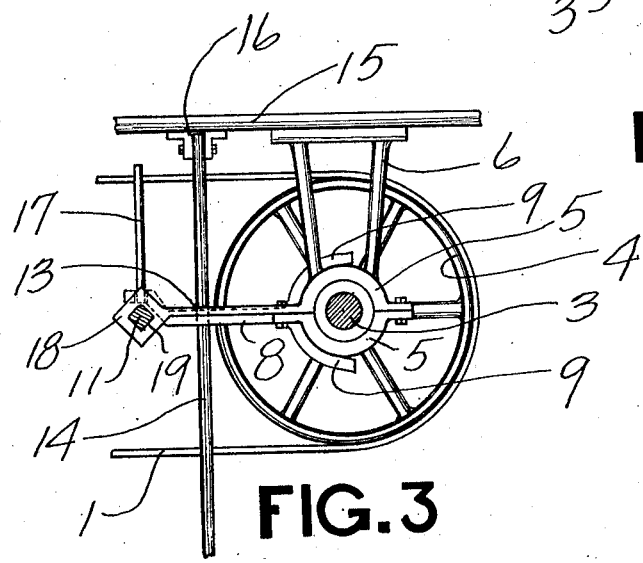
Figure 3 is a side elevation.

In carrying out the invention a hanger 6 is suspended from the ceiling 15 to one side of the live pulley 2 permanently mounted on the line shaft 3. This hanger 6 carries a sleeve 5 disposed toward the pulley 2, and which embraces the line shaft 3 and is of sufficient internal diameter to run entirely free and clear of the line shaft, there being a space 7 intervening between the two.

An idler pulley 4 of equal diameter with the pulley 2, is journaled to rotate freely on the sleeve 5 at the side of the live pulley 2 and may also be slid sidewise up against that pulley in order that it may be set in motion by such contact, in the process of shifting the belt 1. A bracket 18 is extended out laterally and horizontally from the hanger 6 and a squared guide way 19 is formed at its outer end and directed parallel with the line shaft 3. A squared shift rod 11 is slidingly mounted through the guide way 19. A shift lever 8, pierced with a handle hole 13, and having fingers 9 is mounted in place with the fingers a-straddle the sleeve 5 and interposed between the hanger 6 and the idler 4, the shank of the said shift lever being pivoted at 12 on the shift rod 11. A handle 14, hinged at 16 to the ceiling 15 passes down through the hole 13 to a point within reach of the operator. Shift pins 17 are mounted on the shift rod 11, one at each side of the belt 1.

In operation, the belt 1, shown in Figure 1 in solid lines as engaging the live pulley 2, may be readily shifted to the idler 4 as shown in Figure 1 in dotted lines by merely manipulating the handle 14. The idler pulley 4 is first forced against the live pulley 2 to start it revolving therewith, after which the belt 1 may be readily shifted from the one pulley to the other, as desired. Movement of the handle 14 results in a corresponding movement of the shift rod 11, this in turn forcing the belt 1 from one pulley to the other through the pressure of the shift pins 17. The sleeve 5 and idler 4 may be made in half sections in a known way, and bolted together over the shaft 3, to avoid the necessity of taking down any of the shafting or pulleys.

While the device is herein described as mounted from the ceiling, it may be as readily mounted on the floor or in a gutter in the floor, if desired, after a known practice, by merely reversing the method and mountings above described, and while I have herein described a certain specific method of constructing and assembling the elements of my invention, it is understood same may be varied in minor details, not departing from the spirit of my invention as defined in the appended claims.

I claim:

1. A device of the character described, comprising, in combination with the suitably suspended line shaft and live pulley and belt thereon; a hanger; a sleeve mounted on the hanger adjacent the live pulley and loosely embracing the line shaft; an idler pulley, of equal diameter with the live pulley, freely journaled on the said sleeve at the side of the live pulley; a bracket extended laterally and horizontally from the hanger, same having a guide-way parallel to the line shaft; a shift-rod slidingly mounted in the guide-way; shift fingers on the shift-rod at each side of the belt; a shift lever pivoted to the shift rod, same having fingers interposed between the hanger and idler pulley and having a handle hole therethrough; and a handle hinged to the ceiling and passed down through the handle hole of the shift lever.

2. In a device of the kind described, the combination with a line shaft, live pulley and belt, of a hanger having a sleeve loosely embracing the line shaft next the live pulley and a bracket extended laterally, the bracket having a guide-way parallel to the line shaft, a shift rod in the guide way, shift fingers on the shift rod, an idler pulley freely journaled on the said sleeve of the hanger, a shift lever pivoted at one end to the said shift rod and having its free end resting over the line shaft between the hanger and the idler pulley, and a handle hinged at one end and engaging at an intermediate point the said shift lever.

CORMAN E. GARNER.

Witnesses:
W. C. WELLURHOTT,
A. HOLLINGSWORTH.